Feb. 4, 1930. L. W. SHUTTS 1,746,226

VACUUM BOOSTER BRAKE CONTROL VALVE

Filed March 26, 1928

Inventor
Leroy W. Shutts

By Blackmore, Spencer & Hish
Attorneys

Patented Feb. 4, 1930

1,746,226

UNITED STATES PATENT OFFICE

LEROY W. SHUTTS, OF DETROIT, MICHIGAN, ASSIGNOR TO GENERAL MOTORS RESEARCH CORPORATION, OF DETROIT, MICHIGAN, A CORPORATION OF DELAWARE

VACUUM BOOSTER-BRAKE-CONTROL VALVE

Application filed March 26, 1928. Serial No. 264,932.

This invention relates to an improved brake applying mechanism and to that type wherein the manual effort exerted by the operator is supplemented by an auxiliary brake applying means, preferably a source of fluid pressure. Such systems are known and are particularly useful on motor vehicles where brakes must frequently be forcibly applied and where a source of fluid pressure is readily available as an auxiliary source of power, the suction of the engine of the motor vehicle being frequently used for this purpose. In such systems there have been associated a power cylinder and a valve, the latter operated by the pedal in its movements, and which valve comprises movable parts functioning at times to withdraw air from the power cylinder and at other times to admit air to the power cylinder.

The present invention is concerned with such known systems. Its object is to simplify the construction by the avoidance of numerous parts by which the valve is operated. As a further object, the invention provides a construction whereby the variable pressures by which the power cylinder operates and which pressures are under the control of the operator also react upon the pedal to give a "feel" which shall be indicative to the operator of the intensity of the auxiliary force acting to apply the brake. Other objects and advantages will be understood from a reading of the following description and from an examination of the accompanying drawing.

Figure 1:
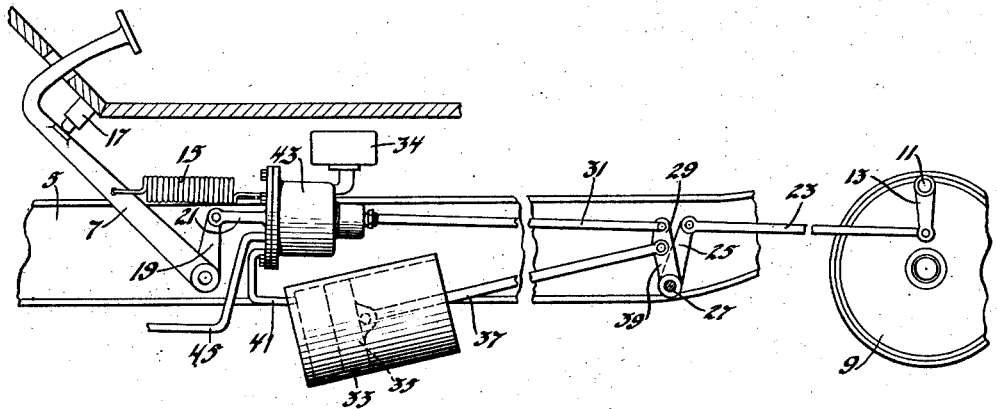
Figure 1 shows in side elevation the novel arrangement constituting my invention.

Referring by reference characters to the drawing, numeral 5 represents a part of a vehicle frame. Numeral 7 represents a pedal for actuating a brake located within a housing 9 and operated by a cam or the like, not shown, but carried on a shaft 11 having an actuating lever arm 13. The housing may consist of a drum on a wheel and a closure plate carried by the axle. These features are conventional and not fully illustrated since the specific details of the brake are not a part of this invention.

The pedal is provided with a retracting spring 15 connected thereto and to any convenient point on the frame. There is also provided a fixed stop 17 to be engaged by the pedal under the action of the spring 15. Rigid with the pedal is an arm 19 connected by a link or rod 21. The arm 13 of the brake actuating means is connected by a rod or link 23, the link 23 being connected at its other end to an arm 25 secured to a rock-shaft 27 suitably journaled in the frame. Shaft 27 also carries a rigid arm 29 to which is connected a rod or link 31 extended to a point adjacent the end of rod 21.

A suitable connection between rods 21 and 31 will obviously give a mechanical brake application upon pressure being applied to the pedal by the foot of the operator.

At 33 is a power cylinder having a piston 35 therein, the piston being connected by rod 37 to an arm 39 also mounted on shaft 27. A conduit 41 communicates with the cylinder 33 on that side of piston 35 remote from rod 37. This conduit connects power cylinder 33 with a control valve designated as an entirety by numeral 43. A conduit 45 communicates with the valve 43 and is to be connected as is usual in such cases with the intake manifold of the internal combustion engine of the vehicle.

In such systems as heretofore arranged, the valve which is the counterpart of valve 43 of this case has been usually so located as to employ a plurality of mechanical parts for its operation by the pedal, and to provide the mechanism through which the variable pressures in the power cylinder and valve react on the pedal to give the desired "feel" indicative to the operator of the work being done by the power cylinder in brake application. The arrangement of valve mounting to be now described avoids this plurality of parts and retains all the functions of the valve including the provision for reaction on the pedal.

Rod 21 is integral with or secured to a cover member 51 attached by fastening means 53 to a housing 55, the parts 51 and 55 constituting the valve 43. The cover member 51 has secured thereto one end of a sylphon bellows 57, the bellows carrying at its movable end a valve seat 59. Within the bellows the cover 51 is formed with a tubular member 61 extending to a point adjacent the valve seat 59. The tubular extension 61 is bevelled off as at 63 to form a valve seat, this being the seat for a valve element 65, the suction valve element of the valve 43. Within the tubular member 61 is a second coaxial tubular extension 67 projecting into the housing 55 and having a terminal annular flange 69 inwardly directed to engage one end of a spring 71. The other end of spring 71 engages a head 73 carried on the inner end of rod 31. Rod 31 has a sliding connection through a cap 75 threaded upon a reduced end 77 of the housing 55. Slidable within said reduced end 77 is a hollow sleeve 79 closed at one end as at 81. Fastening means 83 secure to said sleeve an automatic valve element 85 shaped to engage the movable valve seat 59 carried by the free end of the bellows. Sleeve 79 extends to a point somewhat near head 51 and at that end is formed with a terminal flange 87 against which may rest valve 65. Spring 89 encircles sleeve 79 and engages valve elements 65 and 85. Rod 31 is provided with an abutment 90 operable to at times move sleeve 79 inwardly, by engaging its end closure 81. This functions to raise air valve 85 from its seat 59. Rod 31 also has secured thereto a disk 91 located within the tubular sleeve 79 and near the flange 69 of extension 67. Between the disk 91 and the end 81 of sleeve 79 is a coil spring 93. Preferably the closed end 81 of the sleeve 79 will be inwardly extended as shown in the drawing to make a close sliding fit with rod 31. It will be observed from the drawing that cap 75 is outwardly extended as at 95 to provide a space for the reception of abutment 90 as the rod 31 reciprocates outwardly from the valve chamber. The valve 43 is thus floatingly mounted in a mechanical connection between the pedal 7 and the brake.

This construction simplifies the arrangement whereby the pedal operates the brake and also the valve mechanism and whereby the fluid pressure operating through the valve reacts upon the pedal.

Figure 2:
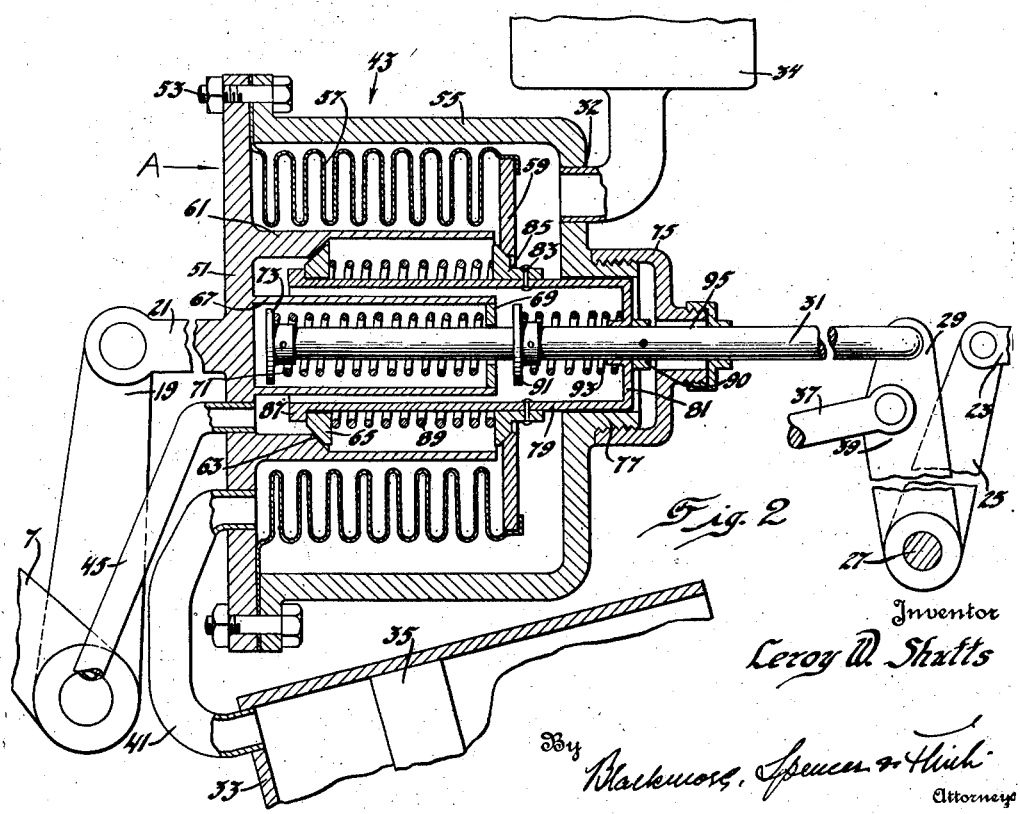
Figure 2 is a transverse section through the valve member showing the operative relation between the pedal and the brake hook-up.

The operation may be briefly described. When the device is at rest the spring 71 has drawn rod 31 to its inward limit, this limit being attained when disk 73 engages head 51. The parts may also be so arranged as to be held in a position of rest when disk 91 engages flange 69. Under these circumstances, the abutment 90 will have pushed sleeve 79 inwardly with the result that atmospheric valve element 85 is lifted from its seat 59. The inner end flange 87 of sleeve 79 will have moved toward head 51, the spring 89 holding the suction valve element 65 against its seat 63. With the parts in these relative positions, the power cylinder 33 is vented to the atmosphere through conduit 41, through the bellows 57 and through the open valve 85 to an opening 32 in the housing member 55. This opening 32 may, and preferably is, provided with a conventional air cleaner 34 to prevent dust or foreign matter reaching the seats of the valves. The pedal may then be depressed to apply the brake. This movement pulls upon the linkage and takes up brake shoe clearance. As soon as an appreciable resistance exists at the brake there occurs a relative movement between the link 21, together with the valve 43 and the rod 31. The spring 71 is comparatively stiff so that further pedal movements move rod 31, but move rod 31 to a lesser extent than rod 21. The extent of movement of rod 31 together with rod 21 amounts to a direct pull upon the brake. The difference in movement of rods 31 and 21 is accommodated by a compression of spring 71 and this difference of movement functions to introduce the suction brake applying means. This relative movement of rod 31 relative to flange 69 also moves disk 91 relative to the sleeve end 81. The abutment 90 is moved away from end 81 and the spring 93 operates to move sleeve 79 and through its connection with air valve element 85 to seat said air valve element. This same movement if continued causes flange 87 to lift suction valve 65 from its seat 63. Figure 2 of the drawing shows the parts in this position. Under these circumstances, not only is there a direct pull from the pedal to the brake through link 21, flange 69, spring 71 and rod 31, but the compression of spring 71 has been accompanied by a movement of disk 91 and through spring 93 of the sleeve 79 whereby the suction valve is opened. The engine therefore is now drawing air from the power cylinder through the conduits 41 and 45, which are in communication through the open suction valve 65. There has been, therefore, a division of pedal effort between a mechanical pull and a force relatively small introducing a supplementary relatively strong fluid pressure brake. As the pressure in the power cylinder goes down, the pressure within the bellows also goes down and the air pressure within chamber 55 outside the bellows tends to contract the bellows but it does so against the tension in the brake applying linkage 21—31. The suction increases in intensity so long as the valve element 65 is held open. As the suction in the bellows increases and since valve seat 59 is practically anchored by the pull of rod 31 through disk 91 and spring 93, the sleeve 79 and valve 85 engaging the seat, the collapsing effect will occur upon the head 51 which carries the other end of the bellows. This atmospheric pressure will obviously act in the direction of arrow A and will tend to push the pedal pad up against the foot of the operator. The greater the suction within the bellows, the greater this reaction upon the pedal pad. The valve is therefore of the reaction type and gives the operator the "feel" which measures for him the intensity of the supplemental power brake applying force. As the suction builds up it, sooner or later, closes valve element 65 maintaining a suction condition within the bellows. Thereafter, the operator may further depress the pedal and if he does so, the increment of his pressure is divided as before between a direct mechanical effort and a valve opening force, the latter measured by the extent to which the spring 71 is compressed by this additional pedal pressure. Again, the suction builds up and gives, as before, a further pressure reaction upon the pedal pad. If the operator completely releases the pedal, the suction valve closes as the spring 71 restores rod 31 to its initial position. The abutment 90 pushes sleeve 79 inwardly and opens the air valve permitting air to flow into the cylinder 33.

It should be explained that the valve has a "follow-up" action which may be described as follows:

As the suction of the engine increases the degree of vacuum within the power cylinder and the bellows in the valve, the collapsing effect of the outside air pressure acting on valve seat 59 causes the valve element 85 and sleeve 79 to move inwardly along rod 31 compressing spring 93. This movement permits valve element 65 to close on its seat 63, thus shutting off the suction of the engine and maintaining the valve and power cylinder at the degree of vacuum attained up to that time. Thereafter, the operator may further depress the pedal again opening valve element 65 and permitting the engine suction to increase the degree of vacuum obtained. The increased pressure difference between the inside and outside of the bellows will again compress spring 93 and permit the valve element 65 to close. Thus it may be seen that the degree of vacuum may be increased by very small amounts until the loading on spring 93 is sufficient to hold the sleeve 79 and valve seat 59 against the pressure difference caused by the maximum degree of vacuum obtainable. In such case, the valve element 65 remains open (because the outside air pressure cannot compress spring 93 further) and the engine suction remains in communication with the power cylinder thus maintaining the maximum braking effect.

I claim:

1. In a mechanical and power brake operating mechanism, a brake, a manually operable member, a tension member connected to said brake and manually operable member, said tension member including a control device for said power brake operating mechanism, said control device constructed to be reactive upon said manually operable member in proportion to the force exerted by said power brake operating mechanism.

2. In a mechanical and power brake operating mechanism, a brake, a manually operable member, a tension member therebetween and connected thereto, a power operated mechanism including a control device concentric with said tension member, said tension member comprising parts movable relatively longitudinally, means operated by said relative movement to actuate said control device, said control device constructed to react upon said manually operable member in proportion to the brake applying force exerted by the power brake operating mechanism.

3. In combination, a manually operable member, a member to be operated thereby, a tension member therebetween, a power operated member, a connection between the said power operated member and said member to be operated, a control element for said power operated member, said control element constituting a part of said tension member and reacting upon said manually operable member.

4. The invention defined by claim 3, said tension member including parts having a relative longitudinal movement, means constituting a part of said control element and operated by the relative movement of said relatively movable parts to control said power device, said control device variably reacting upon said operating means in proportion to the power exerted by said power device.

5. In a mechanical and suction operated brake, a manually operable lever, a brake, a tension element therebetween including a variable volume chamber having a valve to permit evacuation of said chamber, said tension element including relatively movable parts to open said valve, means connecting one wall of said chamber to said brake, means connecting the other wall of said chamber to the manually operable lever whereby the suction condition of said chamber is reactive on said pedal.

6. The invention defined by claim 5, together with yielding means between said relatively movable parts.

7. In combination, a manually operated member, a brake actuating member, a tension member therebetween, a fluid power operating device, a connection between said power operating device and said brake actuating member, a control member for said power operating device associated with said tension member, a conduit for connecting said control member and fluid power device, a conduit from said control member for connection to a source of suction, said control member comprising a collapsible chamber having openings to said conduits, said tension member having parts arranged for relative axial movement, means whereby said axial movement in the act of brake application opens said conduits through said control member.

8. The invention defined by claim 7, said means including a suction valve between said openings, and the separating movements of said parts operable to open said suction valve.

9. The invention defined by claim 7, together with means operable upon said axially movable parts upon release of the manually operated member to restore normal air pressure to said control member and fluid power device.

10. In a mechanical and vacuum power operated brake, a pedal, a brake, a tension member therebetween, said tension member comprising parts movable longitudinally relatively to each other, resilient means to resist movement of separation of said parts, a housing carried by one of said parts, a flexible member carried by said housing, a suction valve seat fixedly carried by said housing, a movable air valve seat carried by the flexible member, an intermediate member within said housing and slidable coaxially thereof, valves engageable with said seats, one slidable on the intermediate member and the other secured to the intermediate member, means associated with said other part to move said intermediate member and said suction valve when said other part moves away from said first part, and other means associated with said other part and operable upon the opposite movement of said other part relative to the first part to permit the suction valve to close and to positively open the air valve.

11. The invention defined by claim 10, said flexible member being a sylphon bellows.

12. The invention defined by claim 10, said means whereby the other part opens the suction valve comprising a disk secured to said other part and a spring between said disk and said intermediate member.

13. The invention defined by claim 10, said means whereby the other part opens the air valve comprising an abutment on said other part movably engaging said intermediate part under the return action of the first-mentioned resilient means.

14. In combination, a manually operable member, brake means, tension means between and connected to said member and brake means, fluid pressure brake operating mechanism, a control valve for said fluid pressure brake operating mechanism, said control valve constituting a part of said tension means and reacting under the influence of pressure conditions therewithin upon said manually operable member.

In testimony whereof I affix my signature.

LEROY W. SHUTTS.